July 2, 1935. E. W. FAVALORA 2,006,858
PORTABLE AIR COOLING, DEHYDRATING AND WASHING APPARATUS
Filed Nov. 15, 1932
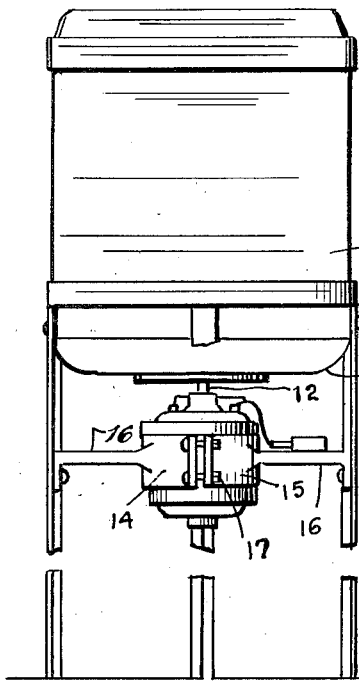
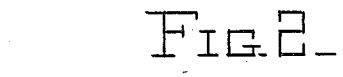
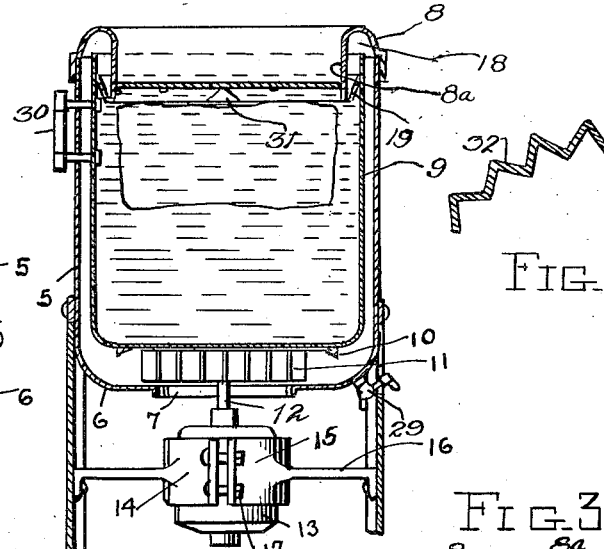
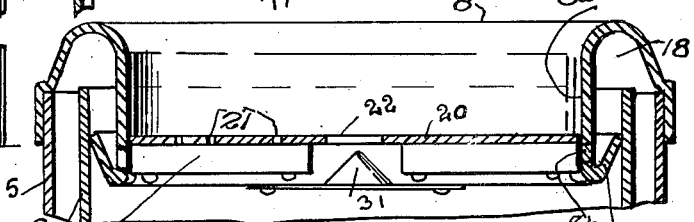
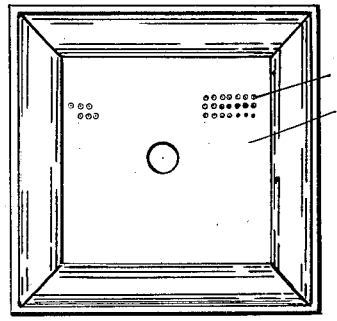
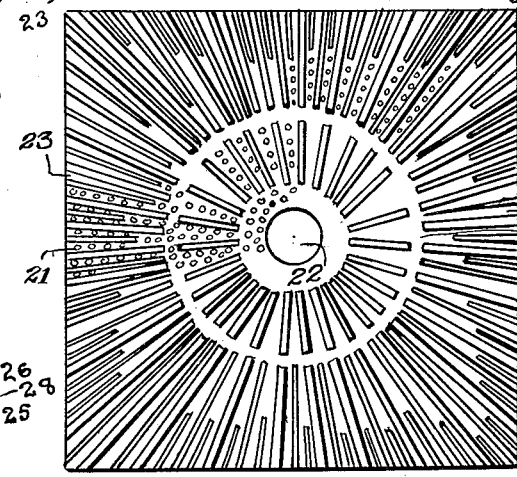
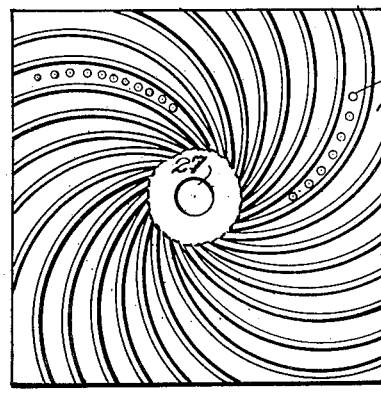
INVENTOR
Emile W. Favalora Patented July 2, 1935

2,006,858

UNITED STATES PATENT OFFICE 2,006,858

PORTABLE AIR COOLING, DEHYDRATING, AND WASHING APPARATUS

Emile W. Favalora, New York, N. Y.

Application November 15, 1932, Serial No. 642,700

2 Claims. (Cl. 261—121)

This invention relates to improvements in devices for cooling, washing and dehydrating air, and its leading object is to provide a simple and portable device for conditioning the air of a room, so as to lower its humidity and at the same time lower its temperature and remove free dust from it.

Another object of the invention is the provision of a portable device, wherein the air is caused to circulate around a cooling surface, which may be maintained at a low temperature by means of a block of ice, or by means of any suitable motorized refrigerating means, and is then directed through the upper layer of a body of water in fine streams so as to produce a flow of air bubbles through or against the water, so that heat is surrendered to the water, free dust is taken up by the water, and the moisture of the inflowing air is caused to condense around the cooling surface or medium, thus reducing its humidity.

A still further object of the invention is to improve the circulation of the cooled air against the water, by means of a distributing plate which is formed with numerous bubble directing channels, so arranged that the air flow is directed toward the center of the device, so as to maintain considerable travel for the air bubbles and to maintain the same separate in different paths, whereby the maximum frictional area of the air quantities is presented to the water.

With the above and other objects in view the invention consists in certain new and useful constructions, combinations, and arrangement of parts, clearly described in the following specification, and fully illustrated in the accompanying drawing, in which:—

Fig. 1 is a side elevation, showing the legs broken away for convenience.

Fig. 2 is a vertical sectional view through the apparatus.

Fig. 3 is an enlarged, fragmentary, vertical sectional view through the head of the apparatus.

Fig. 4 is a top plan view of the apparatus.

Fig. 5 is a bottom plan view, on an enlarged scale of the distributor plate.

Fig. 6 is a similar view, on a reduced scale, of a modified form of the distributor plate.

Fig. 7 is a detail sectional view of a corrugated inner tank.

Referring to the accompanying drawing, illustrating the practical construction of the invention, 5 designates an outer vessel, which is provided with a bottom 6, having a large air intake opening 7. The upper end of this vessel is closed by an annular member 8, so as to provide a large circular air discharge opening within said annular member 8.

Within the vessel or tank 5 an inner vessel or tank 9 is arranged, so as to be concentrically spaced from the wall of the vessel 5. This inner vessel or tank is supported by the cross bars 10 above the bottom wall 6 of the outer vessel or tank.

A force fan 11 is positioned under the bottom wall of the inner vessel or tank and above the bottom wall of the outer vessel or tank, on the shaft 12 of the vertical motor 13, which is supported in place by the spider, which comprises sections 14 and 15, the radiating arms of which are bolted or otherwise supported on the supporting legs 16. The spider sections 14 and 15 are clamped tightly around the body or field of the electrical motor 13 by means of the clamping screws 17.

The annular wall of the inner vessel extends upwardly under the annular member 8, so as to provide an air passage 18 above the upper edge of the wall of said inner vessel. The depending inner wall 8a of said annular member, which is formed U-shaped in cross section, is spaced concentrically from the upper edge portion of the wall of the inner vessel and is provided with an outwardly and upwardly inclined deflecting flange 19, which is maintained in direct physical contact with the inner surface of the wall of the inner vessel.

A distributor plate 20 is supported within the wall 8a and this plate is formed with innumerable spaced apart air openings 21 and may be provided with a central air opening 22. The underside of this plate is formed with a series of radiating tracks 23, which are designed to conduct small air bubbles from the small air openings 8b of the member 8 to the central air opening 22, across any of the small openings 21, which intersect the bubble channels, or grooved tracks.

The air stream is forced under this distributor plate by the action of the motor driven fan, and is divided into small jet streams. The air flows against or through the upper layer or mass of water which nearly fills the inner vessel, and which is kept cooled by a cake of ice floating in the water. The level of the water is maintained slightly over the distributor plate, so that no great air pressure will be required to force the air through the water. In causing the air to pass through the water or in frictional contact with it, it is advisable that the air be broken up into minute masses, so that there will be the maximum frictional contact between the water and the air masses.

This useful result is accomplished by causing the air to be discharged through small openings around the distributor plate, and then causing the air to break up into small bubble masses, by its movement through the water, or against the water, in grooved tracks or channels, so that the individual bubbles in one grooved track or channel will be prevented from combining with any adjacent bubbles, with the result that the contained air will have less frictional contact with the water.

The under surface of the distributor plate is preferably roughened, so that it will be effective in breaking up the air bubbles, and cause a discharge of the released air through the intermediate air openings 21 formed in the distributor plate.

The deflecting flange or baffle ring 19 reduces the area of the air passage adjacent the air openings 8b, so that pressure is slightly increased, resulting in a more forcible movement of the air through or against the water.

The breaking up of the air bubbles may be also aided by providing an intermediate channel or track 24, across the grooved tracks or channels 23, and the bubbles flowing along the tracks 23 will strike against the sharp edges of the broken sides or walls of the adjacent or inner sections of the tracks 23, in crossing the intermediate groove 24.

In Fig. 6 I show a helical arrangement of grooved bubble tracks 25, the outer ends of which are located at the marginal edges of the distributor plate 26, and the inner ends of which are located near the center of the plate, which may be provided with a central discharge opening 27. Small air openings 28 are formed in the plate 26 to allow air bubbles to discharge at any point along the grooved tracks. The bottom surface of this plate may be formed with small projections adapted to pierce the bubbles, so as to release the air through the openings 28.

The air from the room is circulated through the space between the inner and outer vessels, by the forcing pressure of the motorized fan. The wall of the inner vessel is maintained at a low temperature by means of a cooling medium, such as ice or any chemical or mechanical refrigeration means. As the flowing stream of air passes over the chilled surface of the inner vessel moisture contained in the air stream will condense and accumulate at the bottom of the outer vessel, from which it may be withdrawn by means of the drain cock 29. A gauge level glass 30 is provided for indicating to the operator the present level of the water. By removing the member 8 additional water may be supplied to the inner vessel, or it may be poured directly over the distributor plate.

The inner tank may be formed with corrugations 32, intended to increase the surface area of all vertical surfaces thereof, to accelerate the cooling of the air flowing against the outer surface, while increasing the area of the surface exposed to the ice water.

A small upstanding cone 31 is supported directly under the central opening 22, and its smaller end is located in spaced relation to the opening 22. This cone tends to prevent the ice from wedging in the opening, as it melts, and thus tends to promote uniform melting of the ice.

The air passing against the wall of the inner vessel is not only cooled, but is to some extent dehydrated. At it flows in frictional contact through or against the water it gives up particles of dust, and is thereby purified. The operation of the apparatus, therefore, results in the cooling, dehydration and cleaning of the air.

The parts of the device are entirely self contained in a portable unit, which may be moved from place to place, without affecting the operation.

Having described my invention I claim:—

1. An air conditioning portable device consisting of a vessel, a tank within the vessel and spaced apart therefrom to provide an air passage between itself and the vessel, means for forcing air through the air passage, means for maintaining the tank chilled, a distributor plate located above the tank and provided with air openings and with bubble directing grooves crossing said air openings, and means for causing the air leaving said air passage to flow through the grooves.

2. An air conditioning device consisting of a tank adapted to contain a cooling medium and provided with an exterior cooling surface, an enclosure for said tank providing an annular passage against said cooling surface, means for inducing a strong air movement upwardly through said passage, an annular deflector supported by the second tank and extending over the upper edge of the first tank and provided with discharge openings through which the air may flow, and a distributor blade supported centrally of said deflector and provided with perforations to permit the air to escape vertically and with a series of bubble forming ribs on its lower surface adapted to be immersed in a cooling liquid arranged in the first tank.

EMILE W. FAVALORA.